Sept. 22, 1931.  W. K. HOWE  1,824,152
SWITCH MACHINE FOR RAILROADS
Filed Jan. 27, 1930
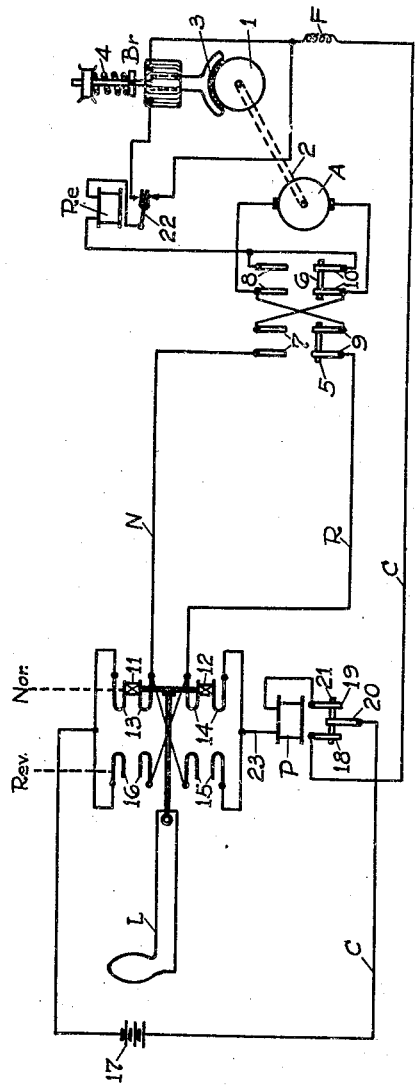
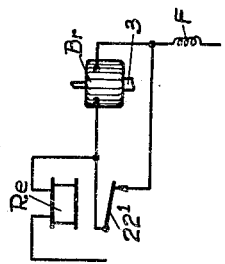
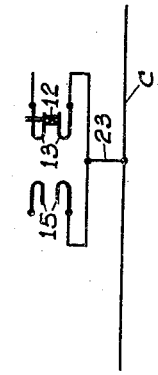
INVENTOR
W. K. Howe,
BY Neil D. Preston,
his ATTORNEY Patented Sept. 22, 1931

1,824,152

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

SWITCH MACHINE FOR RAILROADS

Application filed January 27, 1930. Serial No. 423,743.

This invention relates in general to switch machines, and has more particular reference to an improvement in a switch machine including an electro-magneto brake.

In cases where electro-magneto brakes are used in connection with switch machines, and are connected up in series in the switch machine energizing circuit, as current flow increases through the switch machine motor, a point is reached when the motor armature exerts a torque just sufficient to move the armature. The current at this time can be conveniently termed the "creeping current" and is that current value at which the increasing motor torque just overbalances the decreasing brake torque.

In connection with switch machines, it is always most desirable to protect against crossed wires as, for example, a cross between the normal and the reverse wire leading to the switch machine. From the standpoint of this very essential cross protection, it is most desirable to have the creeping current rather high.

In the event of a cross, such for example as to put energy on the reverse wire when the control lever is in normal position, the unauthorized reverse current is much smaller than the usual authorized reverse current, and hence, by providing that the creeping current be high, unauthorized current due to a cross can be readily prevented from operating the switch machine.

It is usual to employ a polarized relay as a cross protection relay, arranged to open the common return wire from the switch machine, upon cross current flowing, and thereby prevent a cross from operating the switch machine motor.

In the present invention it is contemplated to either include, or exclude, the usual cross protection relay, according to surrounding circumstances.

More specifically, it is proposed to increase the magnitude of the creeping current, by providing means to prevent much, or any, current from flowing through the electromagneto brake upon first energizing the switch machine motor, and this can be accomplished by providing means for opening the brake control circuit, and closing a shunt around the brake, as by means of a relay.

Further objects, purposes and characteristic features will appear as the description progresses, reference being made to the accompanying drawings showing, solely by way of example, and in no manner whatsoever in a limiting sense, several forms which the invention can assume. In the drawings:—

Fig. 1 is a diagrammatic view of one form of the invention.

Fig. 2 is a fragmentary view of a modified form of the invention.

Fig. 3 is a fragmentary view of another modified form of the invention.

Referring now to the drawings, and first to Fig. 1, there is here shown a switch machine having cross protection means of the general type shown in the patent to W. K. Howe, 1,550,611, granted August 18, 1925, and including an electro-magnetic brake of the general type shown in the application of W. K. Howe, Ser. No. 337,000 filed February 2, 1929.

In Fig. 1 is shown, in a diagrammatic manner, a switch machine for operating a track switch, (not shown), having a motor including an armature A and a field F, with a brake drum 1 fastened to the armature shaft 2, and acted on by a brake shoe 3, controlled by a brake coil Br, the brake being normally applied by a spring or the like 4 and released when the brake coil Br is effectively energized.

Controlled by the switch machine motor, in the usual manner, as for example in the Howe patent above referred to, are movable contacts 5 and 6 cooperating with fixed pairs of contacts 7, 8, 9 and 10, to set up normal and reverse energizing circuits for the switch machine motor through normal and reverse wires N and R respectively, upon proper movement of a usual control lever L. The control lever L moves contacts 11 and 12 to cooperate with pairs of fixed contacts 13, 14, 15 and 16 to thereby place energy, as from a battery or the like 17, on the switch machine motor, the usual common return wire C leading back to battery 17 through fixed contacts 18, 19 and 20 and movable contact 21 of a cross protection relay P which functions in the manner set forth in the Howe patent No. 1,550,611 above referred to.

Connected in series with the armature A and field F of the switch machine motor, is a relay Re having a contact finger 22 and back point which disconnects the brake winding Br from the switch machine energizing circuit when relay Re is de-energized, contact finger 22 being a make-before-break contact whereby to prevent it from momentarily de-energizing the switch machine motor when the relay operates. It is only after relay Re picks up, that winding Br is energized and the pressure of brake shoe 3 on brake drum 1 is relieved.

The various parts are shown in the drawings in the positions and conditions assumed when the track switch is in normal position.

If it be desired to throw the track switch to reverse position, lever L is moved from its normal position Nor to its reverse position Rev, whereupon energy from battery 17 is placed on reverse wire R to energize the switch machine motor and relay Re, with the brake at first remaining in its full holding position. Relay Re, is designed to require a very considerable energizing current before picking up, whereby a relatively large current must flow through the reverse wire R before the brake releases, so that the creeping current, that is, the current at which the motor torque just exceeds the brake retarding effect, is relatively large.

The cross protection relay P is a polarized relay, and remains in the position shown when traversed by current returning from the field F of the switch machine and over the common wire C, but is operated by current flowing through it in the reverse direction as, for example, current flowing from wire N, through a hypothetical cross connection between wire N and the wire R, and then through the protection relay P back to battery 17. Thus, a cross between the normal and reverse wires operates to pick up relay P and open contacts 18, 21, 20 to break the common return and thus prevent a cross wire from causing operation of the switch machine.

With the present invention, the cross wire current flowing through, for example, the reverse wire R, will be below the creeping current, that is, the current required to operate the switch machine motor, and hence the cross will fail to do any harm. The unauthorized or cross current is necessarily very much less than an authorized current since, as clearly to be seen in Fig. 1, current flowing from the normal wire N through a cross to reverse wire R transverses multiple paths back to the battery 17, one of which is through the switch machine motor, and the other of which is through the protection relay P.

Furthermore, the cross current will have reached a value far above that required to quickly, positively, and surely cause the protection relay P to open, while still well below the creeping current value, thus further safeguarding the system.

Referring to Fig. 2, there is here shown an arrangement wherein the protection relay is entirely omitted, dependence against unauthorized operation due to a cross, being placed on the relay Re and the brake winding Br, any unauthorized current flowing through the switch machine motor being of insufficient magnitude to operate the motor, that is, being below the creeping current value, since any current due to a cross, flows not only through the switch machine motor but also through wire 23 instead of, as in Fig. 1, through the protection relay P.

Referring now to Fig. 3, a somewhat different arrangement of parts is shown, wherein relay Re has a contact finger $22^1$ which closes a shunt around the brake winding Br, in this case the front contact of relay Re of Fig. 1 being omitted and the brake winding Br being permanently connected in series with the winding of the relay Re. Thus relay Re of Fig. 3, when picked up, opens a shunt path around Br, instead, as in Fig. 1, of making a connection to include the brake winding Br in the switch machine motor energizing circuit.

As demonstrating the advantages of the present invention, tests were run on a G. R. S. Model 5 switch machine having a creeping current through the motor, with no brake use whatsoever, of 1.3 amperes. With a brake employed in series with the motor armature and field, but without any relay Re, that is, without any means for preventing the motor energizing current from immediately starting to release the brake, the creeping current through the motor circuit was 4.4 amperes. With the arrangement as shown in Fig. 1, wherein the relay Re prevents immediate initiation of release of the brake upon energization of the switch machine motor, the creeping current was 15.2 amperes. The relay Re used in this test had a pick-up value of 4.6 amperes and drop-away value of 1.4 amperes.

The above test clearly shows the advantages to be derived from this invention, it being apparent that an unauthorized current transversed the switch machine motor, as for example due to a cross, of less than 15.2 amperes could not operate the switch machine whereas, without the arrangement of parts in accordance with this invention, but employing the electro-magnetic brake connected in series with armature and field of the motor, any unauthorized current not less than 4.4 amperes would operate the switch machine.

The above rather specific description of several forms which this invention can assume, has been given solely by way of example, and is not intended, in any manner whatsoever, in a limiting sense. Obviously, the invention can assume various different physical forms, and is susceptible of numerous modifications, and all such forms and modifications, as come within the scope of the appended claims, are intended to be covered by this application.

Having described my invention, I now claim:—

1. In a switch machine, in combination, an electrically operated motor, a brake for the motor, control means for energizing the motor, and a device to prevent release of the brake until a relatively large energizing current flows through the motor.

2. In a switch machine, in combination, an electrically operated motor, a brake for the motor, control means for energizing the motor, and an electro-responsive means to prevent release of the brake until a relatively large energizing circuit, substantially greater than any likely motor current causable by crossed wires, flows through the motor.

3. In a switch machine, in combination, an electrically operated motor, an electro-magnetic brake released upon effective energization for the motor, control means for energizing the motor, and a translating means to prevent release of the brake until a relatively large energizing current flows through the motor.

4. In a switch machine, in combination, a motor, an electro-magnetic brake associated with the motor, and separate means controlling the release of the brake and effective to cause the brake to release only after a predetermined relatively large energizing current flows through the motor.

5. In a switch machine, in combination, a motor, an electro-magnetic brake associated with the motor, and means controlling the release of the brake and effective to cause the brake to release only after a predetermined relatively large energizing current flows through the motor, said means including a relay connected in the motor energizing circuit and operating, when energized, to set up circuits to effectively energize the brake so as to cause release of the brake.

6. In a switch machine, in combination, a motor, an electro-magnetic brake associated with the motor, a device controlling the release of the brake and effective to cause the brake to release only after a predetermined relatively large energizing current flows through the motor, a control lever for the energizing circuits of the motor, and a cross protection relay arranged to open up the motor energizing circuit when current flows due to crossed wires.

7. In a switch machine, in combination, a motor, an electro-magnetic brake associated with the motor, means controlling the release of the brake and effective to cause the brake to release only after a predetermined relatively large energizing current flows through the motor, said means including a relay connected in the motor energizing circuit and operating, when energized, to set up circuits to effectively energize the brake so as to cause release of the brake, a control lever for the energizing circuits of the motor, and a cross protection relay arranged to open up the motor energizing circuit when current flows due to crossed wires.

8. In a switch machine, in combination, an electric motor, an electric brake for the motor, a relay connected in the energizing circuits of the motor and arranged, when de-energized, to complete a shunt path around the brake, and to open the shunt path and thus cause energization and release of the brake, or energization of the relay.

9. In a switch machine, in combination, an electric motor, an electric brake for the motor, a relay connected in the energizing circuits of the motor and arranged, when deenergized, to complete a shunt path around the brake, and to open the shunt path and thus cause energization and release of the brake, on energization of the relay, control means for energizing the motor for normal and reverse operation by placing energy on a normal and a reverse wire, respectively, the relay requiring an energizing current greater than that producible by a cross connection between the normal and the reverse wires.

10. In a switch machine, in combination, an electric motor, an electric brake for the motor, a relay connected in the energizing circuits of the motor and arranged, when deenergized, to complete a shunt path around the brake, and to open the shunt path and thus cause energization and release of the brake, on energization of the relay, control means for energizing the motor for normal and reverse operation by placing energy on a normal and a reverse wire, respectively, the relay requiring an energizing current greater than that producible by a cross connection between the normal and the reverse wires, said relay, on energization, connecting the brake in the motor energizing circuit.

In testimony whereof I affix my signature.

WINTHROP K. HOWE.